United States Patent [19]

Orphall

[11] Patent Number: 4,826,090
[45] Date of Patent: May 2, 1989

[54] HAMMER ASSEMBLY FOR A ROTARY MATERIAL CRUSHER

[76] Inventor: Axel W. Orphall, 1373 Washington Pike, Bridgeville, Pa. 15017

[21] Appl. No.: 118,067

[22] Filed: Nov. 9, 1987

[51] Int. Cl.⁴ .............................................. B02C 13/28
[52] U.S. Cl. ...................... 241/191; 83/698; 144/230; 241/101.2; 241/195; 241/294; 403/381; 407/40; 407/46
[58] Field of Search ............... 241/191, 291, 197, 293, 241/294, 92, 93, 101.2, 185 R, 189 R, 189 A, 191, 195; 407/46, 40, 41; 144/230; 83/698; 403/381, 376, 379, 341

[56] References Cited

U.S. PATENT DOCUMENTS

| | | | |
|---|---|---|---|
| 671,954 | 4/1901 | Eaton | 403/381 |
| 1,067,910 | 7/1913 | Florey | 403/381 |
| 1,717,759 | 6/1929 | Briggs | 241/197 |
| 3,367,585 | 2/1968 | Ratkowski | 241/197 |
| 3,510,076 | 5/1970 | Perdue | 241/197 |
| 3,981,337 | 9/1976 | Sundström | 241/92 X |
| 4,352,774 | 10/1982 | Hornberger | 241/197 X |
| 4,714,207 | 12/1987 | Schrödl | 241/195 X |

*Primary Examiner*—Joseph M. Gorski
*Attorney, Agent, or Firm*—Armstrong, Nikaido Marmelstein & Kubovcik

[57] ABSTRACT

A hammer assembly for a rotary material crusher having a rotor. The hammer assembly includes a hammer member and a base member. The base member is mounted at one of its ends on the rotor. The hammer member is mounted on the other end of the base member. The hammer member and base member each have two pairs of concave and convex surfaces, one for absorbing centrifugal forces and the other for absorbing impact forces and meshing, one surface with the other. The pair of concave and convex surfaces for absorbing centrifugal force are behind of the centrifugal force radial line of the hammer member in the direction of rotation of the rotor.

9 Claims, 5 Drawing Sheets

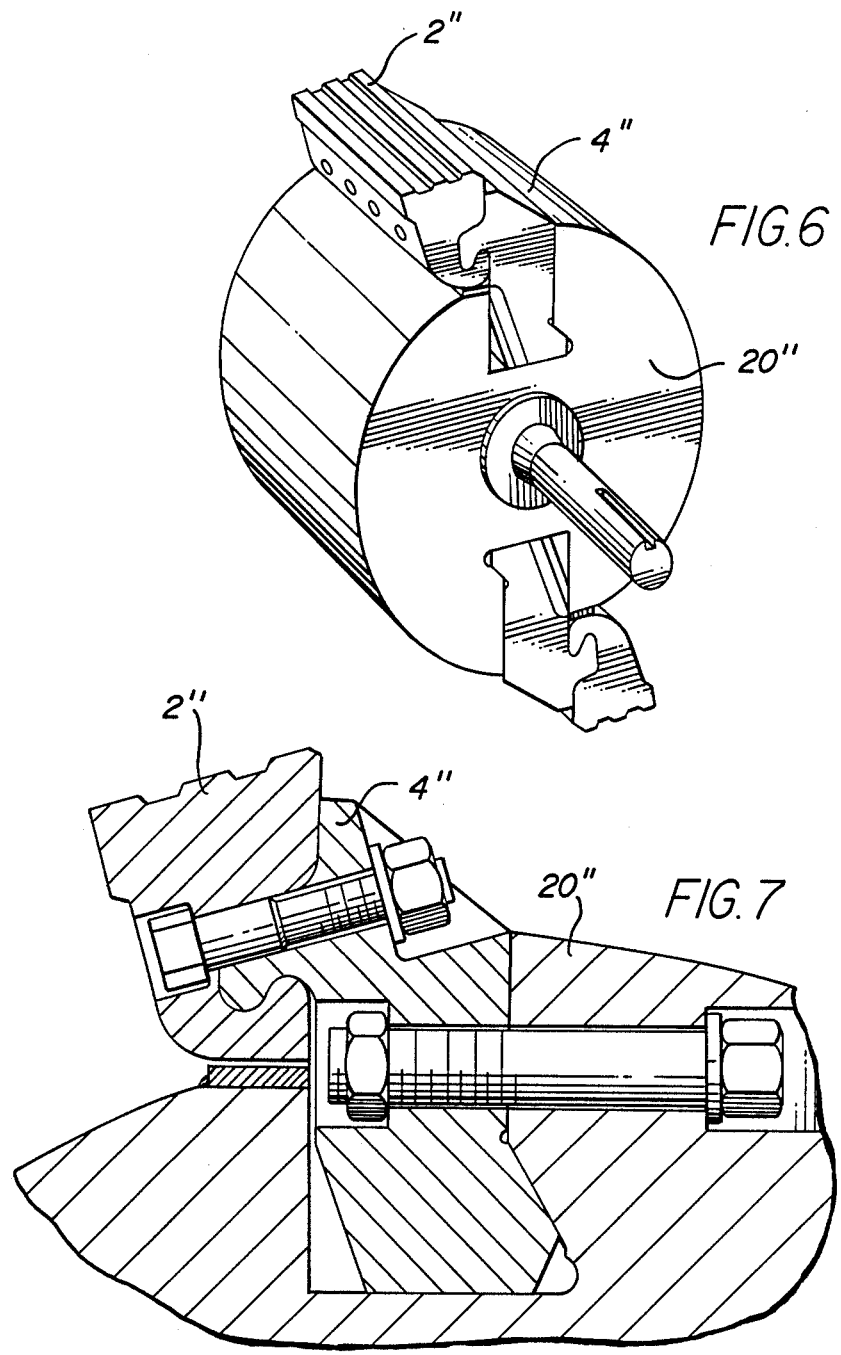

HAMMER ASSEMBLY FOR A ROTARY MATERIAL CRUSHER

This invention relates to a hammer assembly for attachment to the rotor of a rotary material crusher and, more particularly, to a two piece hammer having a base member for attachment to the rotor and a hammer member, which is replaceable and attached to the base member.

In U.S. Pat. No. 3,838,826 and U.S. Application Ser. No. 023,995 filed Mar. 9, 1987 there are disclaimed two piece hammers for attachment to the rotor of rotary material crushers. In such two piece hammers, a base is attached, at one of its ends, to a rotor and an impact member or hammer is fixed to the other end of the base member.

In the arrangement of U.S. Pat. No. 3,838,826, the outer end of the base is provided with grooves extending tangential of the rotor and the hammer members are provided with tongues which are fitted into the grooves. The hammer members, with the tongues in the grooves, are bolted to the base.

In the arrangement of application Ser. No. 023,995, the outer end of the base, at its side facing in the direction of rotor rotation, is provided with a longitudinally extending tongue onto which a groove at the back of the hammer member is positioned and the hammer is then bolted onto the base.

In such rotary material crushers, the rotors are rotated at speeds from 300 to 800 rpm and, depending upon the size and hardness of the material fed to the crusher for crushing such hammers are subjected to high impact forces when impacting the material being crushed and high centrifugal forces when free of such material. Thus, the impact force tends to force the hammer member inwardly and rearwardly on the base member and the centrifugal force tends to swing the hammer member outwardly. Such changes in the forces applied to the hammer member induce bending forces between the hammer member and base member, tend to loosen the hammer member on the base member, cause damage to the surfaces where the hammer member and base member are joined and cause failures on such surfaces due to fatigue of the metal where the members are joined.

In the instant invention the foregoing problems of changes in forces bending between the members, damage to the joining surfaces and fatigue, and failure of the metal where the members join are overcome. This is accomplished in the instant invention by providing selfseating areas between the hammer member and the base member when the hammer is subject to impact forces and to centrifugal forces which have a maximum cross section in the area of impact and are self relieving during changeover between impact and centrifugal loading.

In the instant invention, the head member and base member are each provided with arcuate seats opposite the areas where impact forces are applied to the head and base members and opposite the area where centrifugal forces are applied to the members. These arcuate seats extend across the members parallel to the axis of rotation of the rotor and hammer assembly. The arcuate seats on the members interengage and are self aligned when the impact and centrifugal forces are applied, allowing the forces to be transmitted from the hammer member to the base member during moments of material impact and crushing without substantial transmission of force to centrifugal force arcuate seat and substantial transmission of the centrifugal fences to the impact arcuate seat during transmission of centrifugal forces.

The instant invention will be more fully understood from the following description of a preferred embodiment of the invention taken with the appended drawings, in which FIG. 1 is a perspective view of an embodiment of the invention fitted to one type of rotor;

FIG. 6 is a perspective view, similar to FIGS. 1 and 4 but showing attachment of the base member to a rotor of still another type;

FIG. 7 is an enlarged cross section of the embodiment of FIG. 6;

Figure 1:
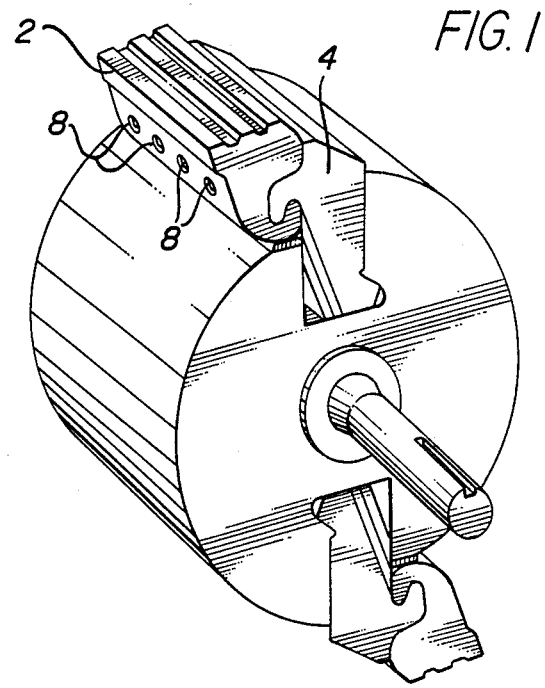
Figure 2:
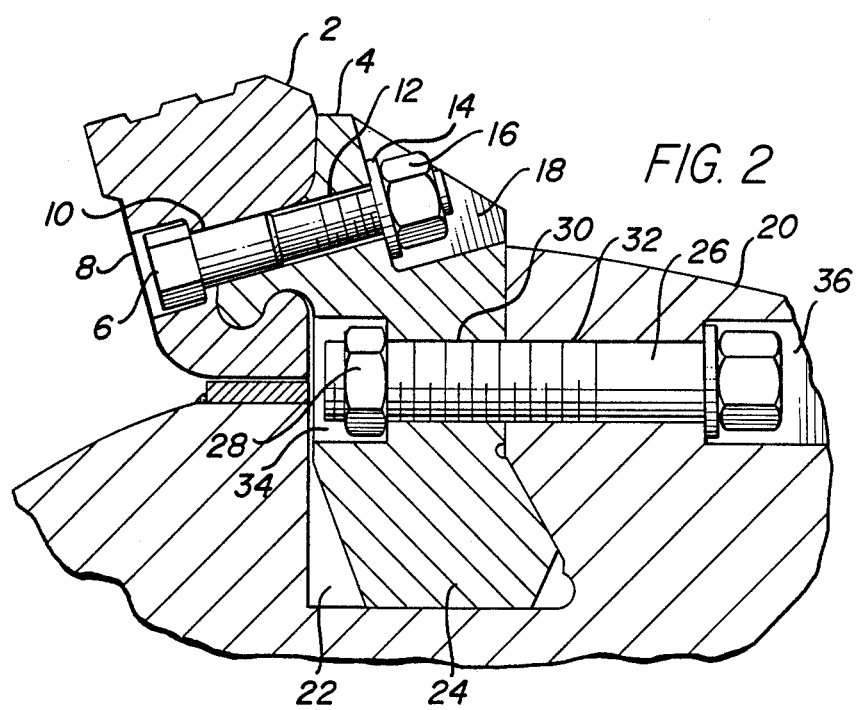
FIG. 2 is an enlarged cross-section of the embodiment of FIG. 1 showing connections of the base member to the rotor and the hammer member to the base member.
Figure 3:
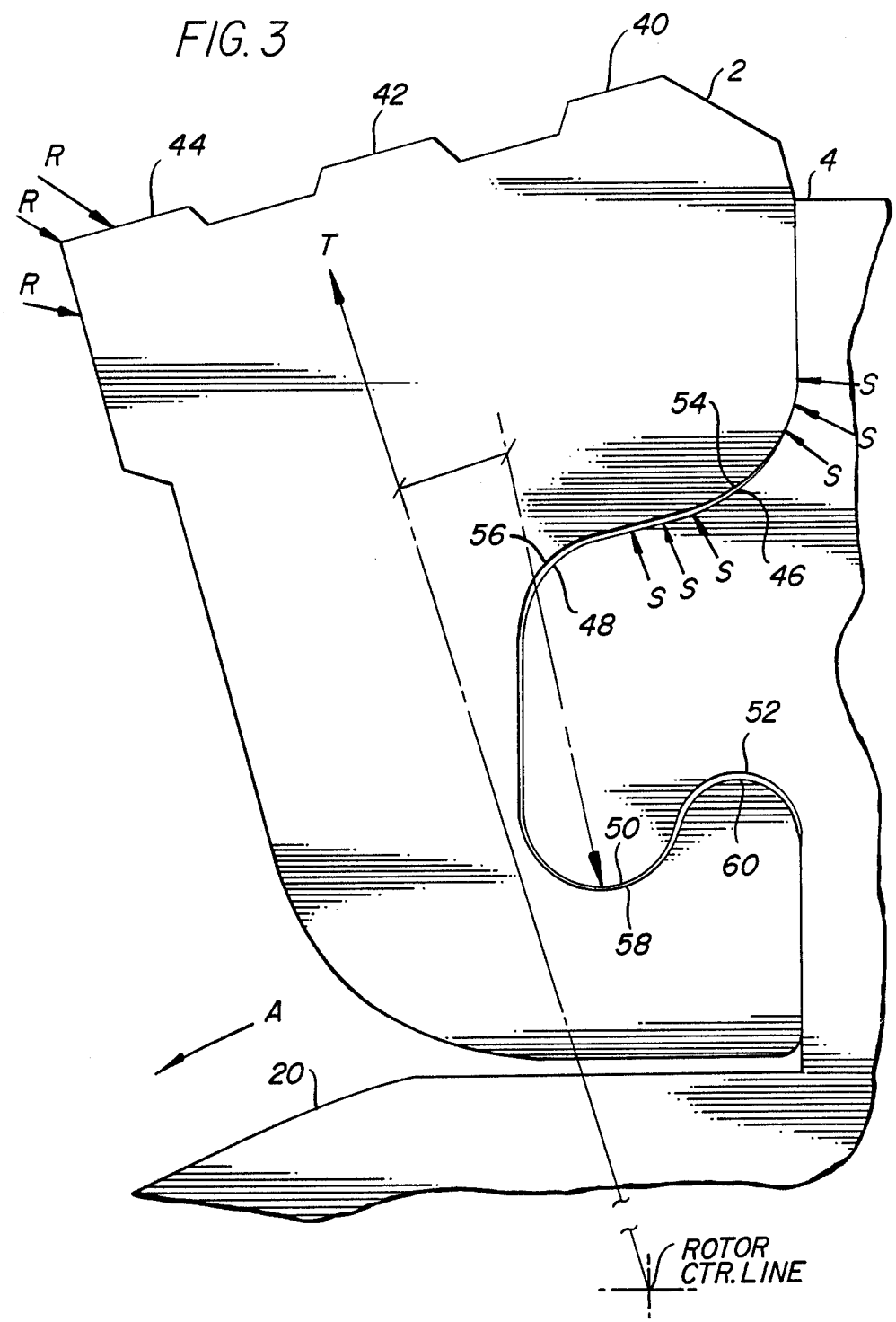
FIG. 3 is an enlarged end view of the hammer member and hammer member end of the base member of the instant invention.

Referring, first, to FIGS. 1–3, hammer member 2 is mounted on one end of base member 4 by bolts 6 in recesses 8 of hammer member 2, extending through bolt holes 10 in hammer member 2 and bolt holes 12 in base member 4. Washers 14 and nuts 16 are applied to the threaded ends of the bolts to mount hammer member 2 on the end of base member 4 the washers 14 and nuts 16 being mounted in recesses 18 in base member 4.

Figure 4:
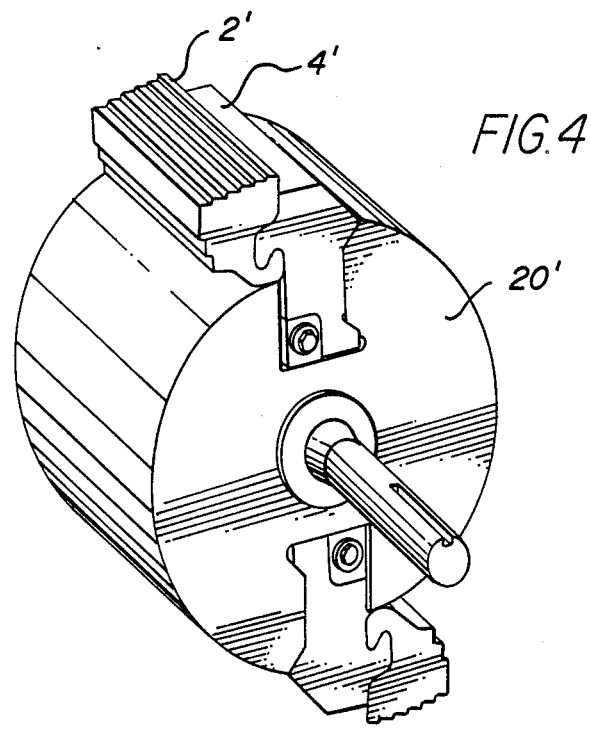
FIG. 4 is a perspective view, similar to FIG. 1, but showing attachment of the base member to a rotor of another type.
Figure 5:
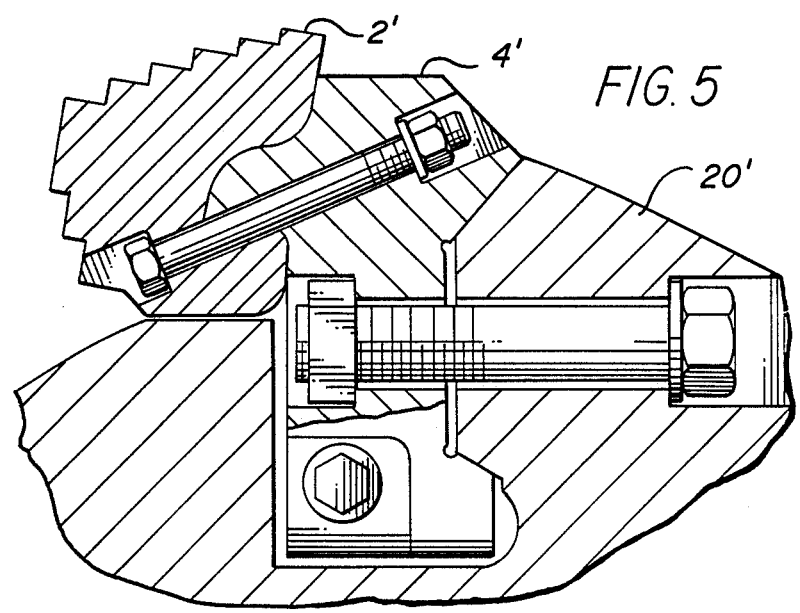
FIG. 5 is an enlarged cross section of the embodiment of FIG. 4.
Figure 8:
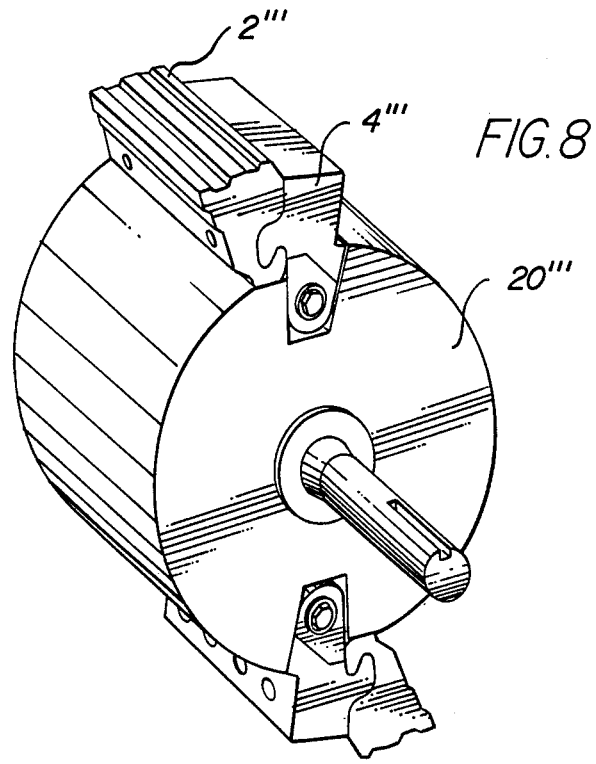
FIG. 8 is a perspective view, similar to FIGS. 1, 4 and 6 but showing attachment of the base member to a rotor of still a further type.
Figure 9:
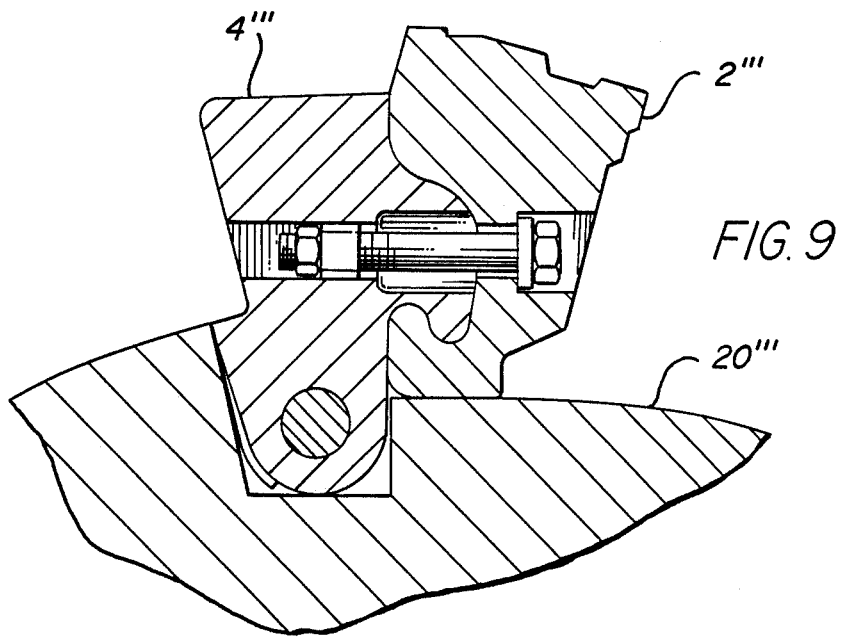
FIG. 9 is an enlarged cross section of the embodiment of FIG. 8.

The attachment of base member 4 to rotor 20 varies depending upon the rotor manufacturer and the attachment system of such manufacture. Thus, the attachments of base member 4 to rotor 20 in FIG. 2 and to rotor 20' in FIGS. 4 and 5, rotor 20" in FIGS. 6 and 7 and rotor 20''' in FIGS. 8 and 9 are not a part of the instant invention but are merely illustration of base member to rotor attaching means.

In the attachment of FIGS. 1 and 2, groove 22 in rotor 20 is enlarged at its inner end and the inner end 24 of base member 4 is offset to fit the wall of groove 22. Base member 4 is fixed to rotor 20 in rotor groove 22 by bolts 26 and nuts 28 passing through holes 30, 32 in base member 4 and rotor 20, respectively, the head of bolts 26 and nuts 28 being recessed in recesses 34, 36 of base member 4 and rotor 20, respectively. At its outer end hammer member 2, FIG. 3, is provided with teeth 40, 42 and 44 which entered longitudinally across the outer surface of hammer member 2, in conventional manner, parallel to the axis of rotor 20 for impact with the material to be crushed.

As best seen in FIG. 3, base member 4 has a concave arcuate surface 46 joined to a convex arcuate surface 48 which surfaces extend longitudinally across the hammer member end of base 4 parallel to the axis of rotor 20 and are in contact with convex arcuate surface 54 and concave arcuate surface 56 of hammer member 2. At the inner end of hammer member 2, base member 4 has a second arcuate convex surface 50 joined to a concave arcuate surface 52 in contact with concave arcuate surface 58 and convex arcuate surface 60, respectively, of hammer member 2. Like surfaces 46, 48, 54, 56, the arcuate surfaces 50, 52 of base member 4 and 58, 60 of hammer member 2 extend longitudinally across base member 4 and hammer member 2, respectively.

As best shown in FIG. 3, the centrifugal force T acts radially outward from the rotor center line along a line spaced forwardly in the counter-clockwise direction of rotation of rotor 20, arrow A, FIG. 3, of arcuate surfaces 50, 52, 58 and 60 such that the centrifugal force acts in a tangential direction about the pivot point as the arcuate surfaces 50, 52, 58 and 60. The movement created by the centrifugal force acts in a clockwise direction about the center of mass of hammer member 2, forcing the arcuate surfaces of hammer member 2 and base member 4 into engagement and provide equilibrium by the seating reaction at arcuate surfaces 46, 48, 54, 56 of hammer member 2 and base member 4 without over-stressing or shearing bolts 10.

Rock, or other material to be crushed, feed to the impact crusher is impacted at the forward end of tooth 44 of hammer member 2 and along the upper or outer end of hammer member 2 along teeth 40, 42 and 44, generating impact forces R along the forward edge of hammer member 2, FIG. 3. Such impact forces R are opposed by reaction forces S along arcuate surfaces 46, 48, 54, 56 without over-stressing or shearing bolts 10. Thus, the impact forces are distributed over a large seating area for superior metal utilization.

The arcuate surfaces 54, 56, 58 and 60 on head members 2', 2'' and 2''', FIGS. 4 and 5, 6 and 7, and 8 and 9, respectively, and arcuate surfaces 46, 48, 50 and 52 on base member 4', 4'' and 4''' are the same as in FIG. 3. FIGS. 4 and 5, 6 and 7, and 8 and 9, show different attachment arrangements for attaching the inner end of base members 4', 4'' and 4''' to rotors 20', 20'' and 20''' which, as already noted, are not a part of the instant invention but are shown herein to demonstrate the versatility of the present invention.

The terms and expressions which have been employed in the foregoing description are used as terms of description and not of limitation, and there is no intention, in the use of such terms and expressions, of excluding any equivalents of the feature shown and described or portions there, but it is recognized that various modifications are possible within the scope of the invention claimed.

I claim:

1. A hammer assembly for attachment to a rotor of a rotary material crusher, said rotor having a plurality of hammer assembly mounting bases thereon spaced equidistantly around said rotor and adjacent the periphery thereof, said rotor being rotatable about an axis of rotation, said hammer assembly including a base member mounted in a fixed position at one of its ends on a hammer assembly mounting base on said rotor adjacent the periphery of said rotor so that said base member does not pivot relative to said rotor, and a hammer member mounted on another end of said base member, said hammer member having a first impact surface facing forwardly in the direction of rotation of said rotor and a second impact surface joined at one of its edges to an outer end of said first impact surface, said second impact surface facing outwardly of said rotor, said fixed member having a first arcuate surface extending parallel to the axis of rotation of said rotor and facing forwardly in the direction of rotation of said rotor, and said hammer member having a first arcuate surface extending parallel to the axis of rotation of said rotor, said first arcuate surfaces being interengaged with each other for transmitting the impact forces of said hammer member generated by the impact of said hammer member with material to be crushed to said base member, said base member having second arcuate surfaces extending parallel to the axis of rotation of said rotor and facing in a radial direction of said rotor towards said rotor, and said hammer member having second arcuate surfaces extending parallel to the axis of rotation and facing away from said rotor, said second arcuate surfaces of said base member being interengaged with the second arcuate surfaces of said hammer member for transmitting the centrifugal force of said hammer member generated by the rotation of said hammer member with said rotor, as said rotor is rotated at high speed, to said base member.

2. A hammer assembly, as recited in claim 1, in which the radial axis of said centrifugal force of said hammer member is in advance of the radial axis of transmittal of said centrifugal force to said second interengaging arcuate surfaces when said rotor is rotated in the forward direction at impact speed.

3. A hammer assembly, as recited in claim 2, in which said first interengaging arcuate surfaces on said base member and said hammer member include connecting, interengaging concave and convex surfaces.

4. A hammer assembly, as recited in claim 3, in which said second interengaging arcuate surfaces on said base member and said hammer member include connecting, interengaging concave and convex surfaces.

5. A hammer assembly, as recited in claim 1, including first bolt means extending through said base member and said rotor adjacent said rotor periphery for attaching said base member to said rotor, and second bolt means extending through said hammer member and said base member for attaching said hammer member to said base member.

6. A hammer assembly, as recited in claim 1, in which said second interengaging arcuate surfaces each include a first arcuate concave portion and a second arcuate convex portion, said first concave portion and said second convex portion being joined end to end.

7. A hammer assembly, as recited in claim 6, in which the first arcuate concave portion of the second interengaging arcuate surface of said hammer member engages the second arcuate convex portion of the second interengaging arcuate surface of said base member, and said second arcuate convex portion of the second interengaging arcuate surface of said hammer member engages the first arcuate concave portion of the second interengaging arcuate surface of said base member.

8. A hammer member for use in replacement for rebuilding of a hammer assembly for attachment to the rotor of a rotary material crusher having a rotor for rotation about an axis of rotation, said hammer assembly having a base member mounted in fixed position at one of its ends on said rotor adjacent the periphery of the rotor so that said base member does not pivot relative to said rotor, said base member having at its other end a first arcuate surface extending parallel to the axis of rotation of rotor and facing forwardly in the direction of rotation of the rotor, and second arcuate surfaces extending parallel to the axis of rotation of the rotor and facing inwardly in a radial direction of that rotor, said hammer member comprising a first impact surface which faces forwardly in the direction of rotation of said rotor, and a second impact surface joined at one of its edges to an outer end of said first impact surface which faces outwardly of said rotor, a first arcuate surface extending parallel to the axis of rotation of the rotor, which first surface engages said first arcuate surface on said base member, and second arcuate surfaces extending parallel to the axis of rotation of said rotor, which second surfaces engage said second arcuate surfaces on said base member.

9. A hammer member, as recited in claim 8, in which said second arcuate surfaces on said hammer member include a first arcuate concave portion which engages with a convex portion of the second arcuate surface of the base member, and a second arcuate convex portion which engages with a concave portion of the second arcuate surfaces of the base member.

* * * * *